(12) United States Patent
Ito

(10) Patent No.: US 7,639,519 B2
(45) Date of Patent: Dec. 29, 2009

(54) SWITCHING BOOSTER POWER CIRCUIT

(75) Inventor: Masahiko Ito, Anjo (JP)

(73) Assignee: DENSO Corporation, Kariya (JP)

( * ) Notice: Subject to any disclaimer, the term of this patent is extended or adjusted under 35 U.S.C. 154(b) by 156 days.

(21) Appl. No.: 11/977,140

(22) Filed: Oct. 23, 2007

(65) Prior Publication Data
US 2008/0111594 A1 May 15, 2008

(30) Foreign Application Priority Data
Nov. 9, 2006 (JP) ............................. 2006-303860

(51) Int. Cl.
H02M 3/18 (2006.01)
G05F 1/40 (2006.01)

(52) U.S. Cl. ......................................... 363/60; 323/265

(58) Field of Classification Search ................. 323/265, 323/271, 273, 282, 283; 363/60
See application file for complete search history.

(56) References Cited

U.S. PATENT DOCUMENTS

| 4,677,366 | A | 6/1987 | Wilkinson et al. |
| 6,014,300 | A | 1/2000 | Yamashita et al. |
| 7,042,275 | B2 * | 5/2006 | Suwa et al. ................... 327/536 |
| 7,449,937 | B2 * | 11/2008 | Takeyama .................... 327/536 |
| 2005/0269999 | A1 | 12/2005 | Liu et al. |

FOREIGN PATENT DOCUMENTS

| JP | 07-123708 | 5/1995 |
| JP | 09-233807 | 9/1997 |
| JP | 2002-199709 | 7/2002 |
| JP | 2005-073403 | 3/2005 |
| JP | 2006-158055 | 6/2006 |

OTHER PUBLICATIONS

Office action dated Jan. 22, 2009 in German Application No. 10 2007 050844.3.

* cited by examiner

*Primary Examiner*—Adolf Berhane
(74) *Attorney, Agent, or Firm*—Harness, Dickey & Pierce, PLC

(57) ABSTRACT

A switching booster power circuit includes a power switch, a booster circuit, a switching control, a voltage detector and a delay circuit. The voltage detector detects an input voltage value at a predetermined point of an electricity supply line from the power switch to an electric load, and determines the input voltage value to be larger than a predetermined voltage threshold or not. The delay circuit outputs an enabling signal enabling the switching control to operate, when a predetermined time period is elapsed after the input voltage value becomes larger than the voltage threshold.

6 Claims, 3 Drawing Sheets

SWITCHING BOOSTER POWER CIRCUIT

CROSS REFERENCE TO RELATED APPLICATION

This application is based on Japanese Patent Application No. 2006-303860 filed on Nov. 9, 2006, the disclosure of which is incorporated herein by reference in its entirety.

BACKGROUND OF THE INVENTION

1. Field of the Invention

The present invention relates to a switching booster power circuit.

2. Description of Related Art

A switching booster (step-up) power circuit includes a booster circuit and a switching control between a direct-current power source and a capacitor. The booster circuit has a switching element, and the switching control controls on/off of the switching element of the booster circuit.

JP-A-7-123708 discloses a booster circuit, which is constructed by a coil, a diode and a switching element, e.g., transistor, for example. The booster circuit gradually increases voltage, so that the capacitor of the switching booster power circuit can be charged with a larger amount of energy.

That is, the switching booster power circuit charges the capacitor, when activated. Immediately after the activation is started, an equivalent impedance of the capacitor is approximately zero, because the capacitor has not been charged yet. Therefore, at the activation, a rush current passes through the switching booster power circuit. The rush current represents a relatively large current, which temporarily passes when direct-current electricity is applied to an electric load (current consumer) having a capacitance.

Further, immediately after the switching booster power circuit is activated, input voltage of the direct-current power source is gradually increased to be a maximum voltage value of the direct-current power source. The rush current passes mainly in a period before the input voltage becomes equal to the maximum voltage value.

When the transistor (switching element) is turned on while the rush current passes through the circuit, the rush current passes through the transistor. In this case, the transistor may be damaged. Therefore, in a conventional art, the switching element has a relatively large capacity to withstand the rush current.

Further, a control device, e.g., microcomputer, for controlling activation of the switching control may be disposed at a subsequent part of the capacitor to be charged. In this case, the microcomputer can prevent the switching element from being turned on while the rush current passes through the circuit.

However, when the switching element has the relatively large capacity to withstand the rush current, the switching element may be expensive. Further, when the microcomputer controls the switching control, a start-up time and a self-check time of the microcomputer are needed before the controlling of the switching control is started. In this case, the starting of the controlling of the switching control may be too much delayed even after the rush current passes through the circuit. Then, start of voltage increasing by the booster circuit may be delayed.

Further, the microcomputer is activated only when a rated voltage is supplied thereto, after electricity is supplied from the direct-current power source and the booster circuit. That is, a step-down circuit decreases voltage supplied from the direct-current power source and the booster circuit to the rated voltage, and the microcomputer is activated with the decreased voltage (rated voltage). Therefore, time is more needed for activating the microcomputer, so that the start of the voltage increasing by the booster circuit may be much delayed. Here, the rated voltage represents a voltage with which electric equipment normally operates.

Further, the activation of the microcomputer is used as a reference timing for the switching control to start controlling the switching element. That is, voltage decreased by the step-down circuit is used as a reference voltage for the switching control to start controlling the switching element. Because voltage supplied from the direct-current power source is not directly used as the reference voltage for the switching control to start controlling the switching element, the start of the controlling of the switching element may be more delayed.

Furthermore, even after the rated voltage is supplied to the microcomputer, the microcomputer is activated only when the rated voltage becomes stable after reset. Thus, the start of the controlling of the switching element may be more delayed. That is, in the case where the microcomputer controls the switching control, the start of the controlling of the switching element may be too much delayed.

SUMMARY OF THE INVENTION

In view of the foregoing and other problems, it is an object of the present invention to provide a switching booster power circuit.

According to an example of the present invention, a switching booster power circuit includes a power switch, a booster circuit, a switching control, a voltage detector and a delay circuit. The power switch connects a direct-current power source and an electric load having a capacitance. The booster circuit includes a coil, a diode and a switching element. The coil is disposed in an electricity supply line from the power switch to the electric load, and is connected in series with the power switch. The diode is disposed between the coil and the electric load in the electricity supply line, and is connected in series with power switch. The switching element is connected in parallel with the power switch, between the coil and the diode. The switching control controls on/off of the switching element. The voltage detector detects an input voltage value at a predetermined point of the electricity supply line, and determines the input voltage value to be larger than a predetermined voltage threshold or not. The voltage threshold is equal to or smaller than a maximum voltage value of the direct-current power source. The delay circuit outputs an enabling signal enabling the switching control to operate, when a first predetermined time is elapsed after the input voltage value becomes larger than the voltage threshold.

Accordingly, rush current is restricted from passing through the switching element, and the switching element can be easily and stably controlled.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENT

Figure 1:
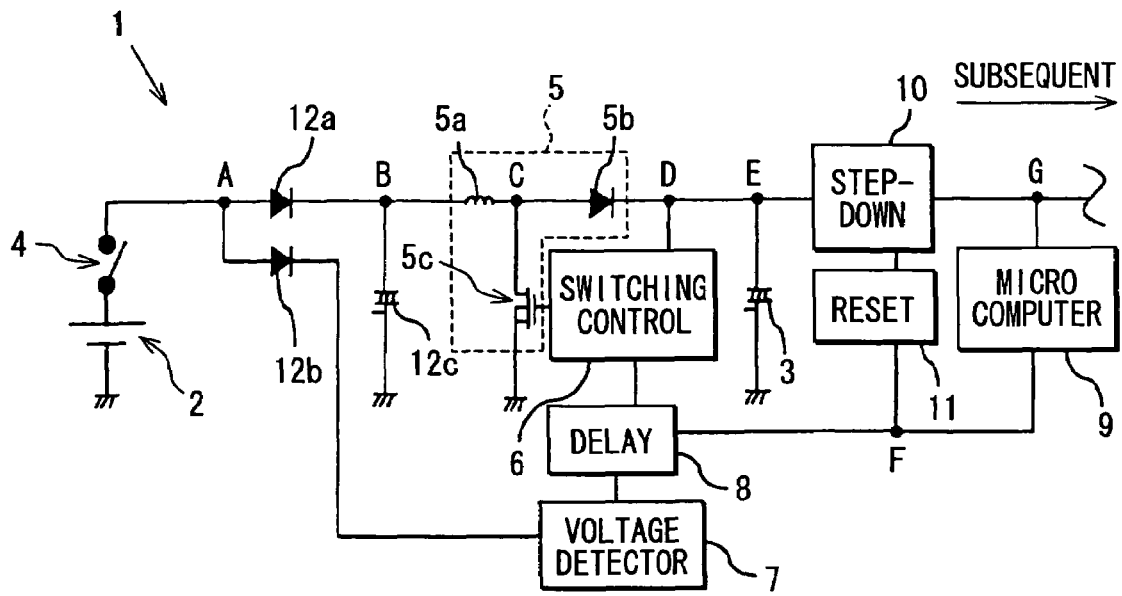
FIG. 1 is a schematic circuit diagram showing a switching booster power circuit according to an embodiment of the present invention.

As shown in FIG. 1, a switching booster power circuit 1 includes a power switch 4, a booster (voltage step-up) circuit 5, a switching control 6, a voltage detector 7, a delay circuit 8, a microcomputer 9, a voltage step-down circuit 10 and a reset circuit 11. The power switch 4 connects a battery 2 (direct-current power source) and an output capacitor 3 (electric load). Further, the switching booster power circuit 1 includes a diode 12a, a diode 12b and a smoothing capacitor 12c, which are used for stabilizing voltage of the battery 2.

A positive electrode of the battery 2 is connected to the power switch 4, and a negative electrode of the battery 2 is connected to a vehicle ground (GND). When the power switch 4 is turned on, the battery 2 supplies electricity to the output capacitor 3. Here, a line from the power switch 4 to the output capacitor 3 is defined as an electricity supply line. Immediately after the power switch 4 is turned on, an equivalent impedance of the output capacitor 3 is zero, because the output capacitor 3 has not been charged. Therefore, rush (temporary large) current passes through the output capacitor 3, immediately after the power switch 4 is turned on. A passing time of the rush current can be measured in advance due to experiments.

The output capacitor 3 is charged with electricity, and outputs a smoothed voltage. The output capacitor 3 has a relatively large capacitance, e.g., 7000 µF, and is mainly used as a backup for the battery 2. For example, when the switching booster power circuit 1 is used for supplying electricity to a vehicle airbag device, the output capacitor 3 is capable of supplying electricity to the airbag device to be activated, if the battery 2 is damaged by impact of vehicle collision.

A first end of the power switch 4 is connected to the positive electrode of the battery 2, and a second end of the power switch 4 is connected to an anode of the diode 12a, 12b through a voltage detection point A. A cathode of the diode 12b is connected to the voltage detector 7. That is, the voltage detector 7 detects an input voltage value at the voltage detection point A. As shown in FIG. 1, the voltage detection point A is located at a current consuming side of the power switch 4, and no element is disposed between the power switch 4 and the voltage detection point A.

The booster circuit 5 includes a coil 5a, a diode 5b and a field-effect transistor 5c (switching element). The coil 5a is an element for storing and emitting magnetic energy, and inducing voltage. The coil 5a is disposed in the electricity supply line, and a first end of the coil 5a is connected to a connection point B between the cathode of the diode 12a and a first end of the smoothing capacitor 12c. That is, the coil 5a is connected in series with the power switch 4 in the electricity supply line. Here, the smoothing capacitor 12c is an element for smoothing the voltage of the battery 2, and a second end of the smoothing capacitor 12c is connected to the vehicle GND. Further, a second end of the coil 5a is connected to a connection point C between an anode of the diode 5b and a drain of the field-effect transistor 5c.

The field-effect transistor 5c controls current passing through the coil 5a. The drain of the field-effect transistor 5c is connected to the connection point C, and a gate of the field-effect transistor 5c is connected to the switching control 6. A source of the field-effect transistor 5c is connected to the vehicle GND. That is, the field-effect transistor 5c is connected in parallel with the power switch 4 at the connection point C.

A cathode of the diode 5b is connected to a connection point E between the output capacitor 3 and the step-down circuit 10, through a voltage monitor point D of the switching control 6. That is, the diode 5b is connected in series with the power switch 4 in the electricity supply line, and the diode 5b is disposed at a current consuming side of to the coil 5a. Here, the voltage monitor point D is disposed between the cathode of the diode 5b and the connection point E. The switching control 6 monitors voltage at the voltage monitor point D, and controls the field-effect transistor 5c such that the input voltage value is appropriately boosted (increased).

The switching control 6 outputs a driving signal 6a (see FIG. 2) to switch the field-effect transistor 5c. That is, the switching control 6 controls on/off of the field-effect transistor 5c. The switching control 6 has three terminals, which are connected to the gate of the field-effect transistor 5c, the voltage monitor point D and the delay circuit 8, respectively. The switching control 6 operates in response to an enabling signal 8a (see FIG. 2) output from the delay circuit 8.

A first end of the output capacitor 3 is connected to the connection point E, and a second end of the output capacitor 3 is connected to the vehicle GND. The step-down circuit 10 gradually decreases voltage supplied from the battery 2 or the output capacitor 3, and supplies the decreased voltage to the microcomputer 9. Here, the step-down circuit 10 is set such that the decreased voltage is to be a normal operation voltage, i.e., rated voltage 9a (see FIG. 2) of the microcomputer 9. The step-down circuit 10 has three terminals, which are connected to the connection point E, the microcomputer 9 and the reset circuit 11, respectively.

That is, the microcomputer 9 is connected in parallel with the connection point E located between the connection point D and the output capacitor 3. Further, the step-down circuit 10 is disposed between the connection point E and the microcomputer 9.

The reset circuit 11 outputs a start-up signal 11a (see FIG. 2) into the microcomputer 9 after the decreased voltage becomes stable. The start-up signal 11a is used for activating the microcomputer 9. Here, the start-up signal 11a is also output into the delay circuit 8. That is, the reset circuit 11 detects the decreased voltage, and outputs the start-up signal 11a into the microcomputer 9 and the delay circuit 8 when a reset time T3 (see FIG. 2) is elapsed after the decreased voltage becomes approximately equal to the rated voltage 9a. The reset time T3 is long enough for the decreased voltage to become stable as the rated voltage 9a. In the reset time T3, a transmission circuit of the microcomputer 9 becomes stable. A first end of the reset circuit 11 is connected to the step-down circuit 10, and a second end of the reset circuit 11 is connected to a connection point F located between the delay circuit 8 and the microcomputer 9.

The microcomputer 9 is used as an electric control unit (ECU) for controlling a vehicle airbag device, for example. A first end of the microcomputer 9 is connected to a connection point G located between the step-down circuit 10 and a subsequent load (not shown), and a second end of the microcomputer 9 is connected to the connection point F.

Figure 2:
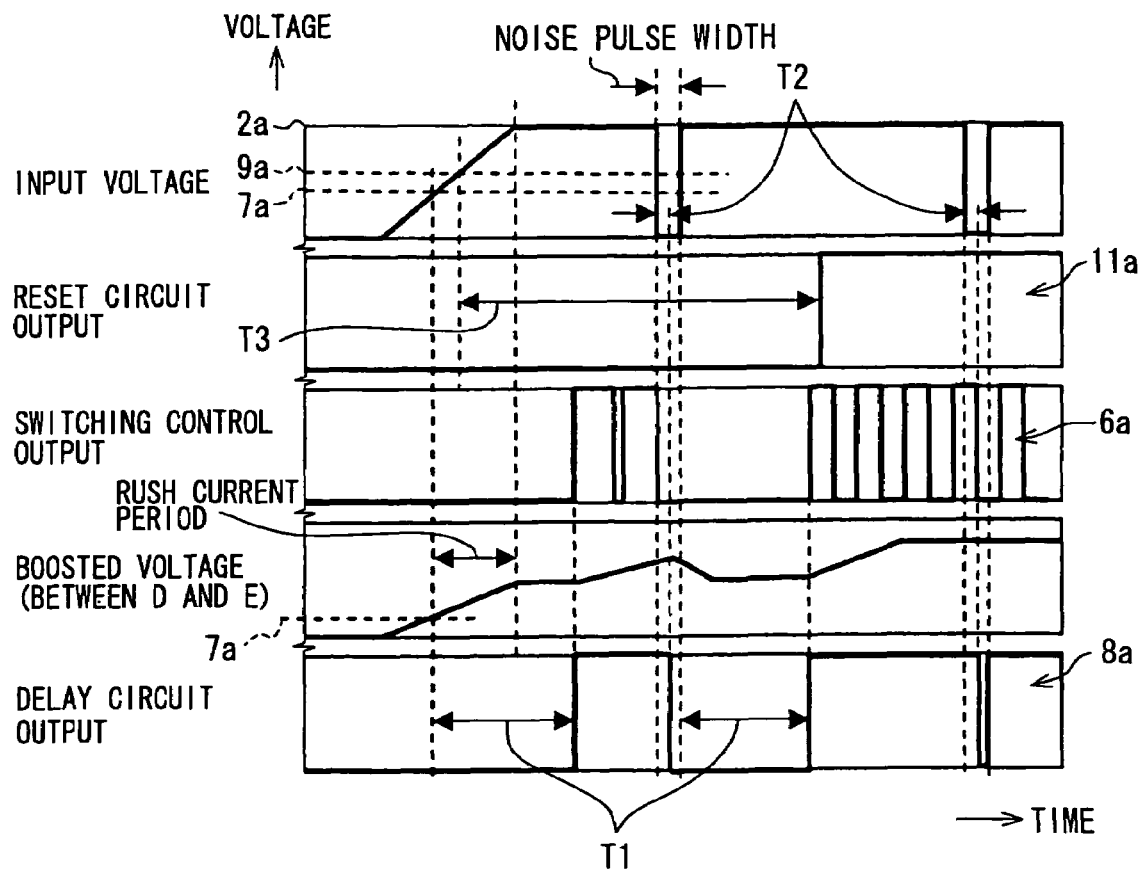
FIG. 2 is a schematic graph showing a relationship of voltage levels in the switching booster power circuit.

Here, the voltage detector 7 and the delay circuit 8 will be described with reference to FIGS. 1, 2, 3 and 4. As shown in FIG. 1, the voltage detector 7 is connected to the voltage detection point A through the diode 12b. The voltage detector 7 is set to have a predetermined voltage threshold 7a (see FIG. 2). As shown in FIG. 2, the voltage threshold 7a is equal to or smaller than a maximum voltage value 2a of the battery 2. The maximum voltage value 2a represents a stipulated voltage value. The voltage detector 7 compares the input voltage value detected at the voltage detection point A with the voltage threshold 7a to determine the input voltage value to be larger than the voltage threshold 7a or not.

When the voltage detector 7 determines the input voltage value to be larger than the voltage threshold 7a, the determination is transmitted to the delay circuit 8. The delay circuit 8 outputs the enabling signal 8a into the switching control 6, when an increasing delay time T1 is elapsed after the determination is transmitted to the delay circuit 8. That is, the delay circuit 8 has a delay function. Then, the switching control 6 becomes capable of operating in response to the enabling signal 8a. That is, the delay circuit 8 outputs the enabling signal 8a into the switching control 6, when the increasing delay time T1 is elapsed after the input voltage value becomes larger than the voltage threshold 7a.

Further, the delay circuit 8 stops outputting the enabling signal 8a, when the input voltage value continues to be smaller than the voltage threshold 7a for a noise filter time T2 (see FIG. 2) while the delay circuit 8 outputs the enabling signal 8a. In contrast, when the input voltage value does not continue to be smaller than the voltage threshold 7a for the noise filter time T2, the delay circuit 8 continues to output the enabling signal 8a.

Figure 3:
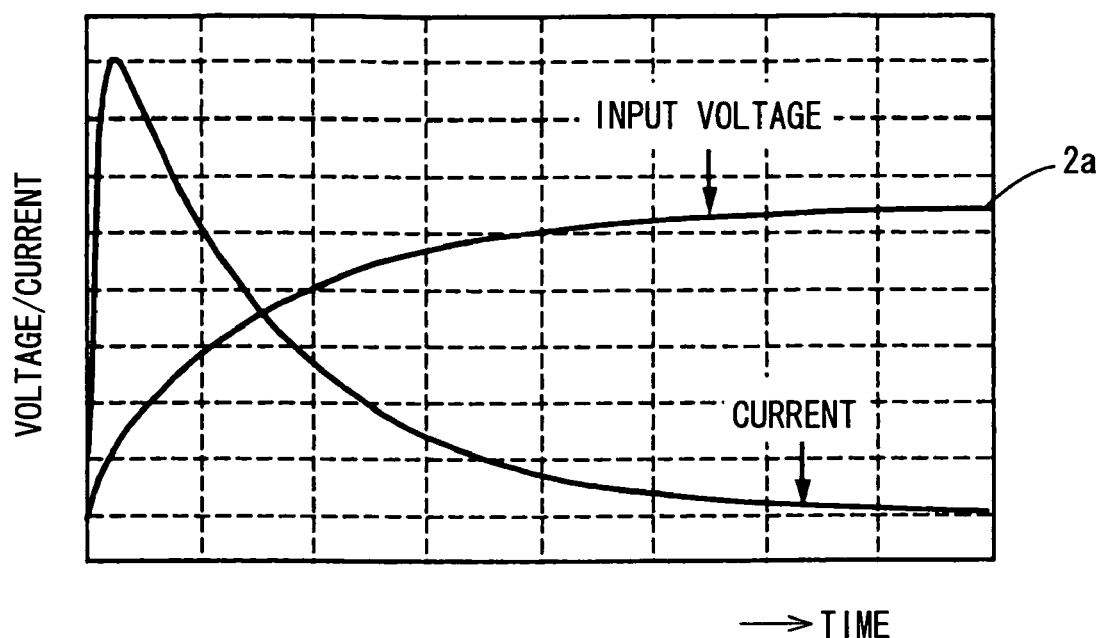
FIG. 3 is a schematic graph showing a relationship between an input voltage and a current of the switching booster power circuit.

The increasing delay time T1 and the noise filter time T2 are predetermined for the delay circuit 8. Here, the increasing delay time T1 corresponds to a time period started when the input voltage value becomes approximately equal to the voltage threshold 7a and ended when the rush current approximately completely disappears. As shown in FIG. 3, after the switching booster power circuit 1 is activated, that is after the power switch 4 is turned on, the rush current passes until when the input voltage value becomes stable as the maximum voltage value 2a. That is, the increasing delay time T1 is set to be a time period slightly larger than a time period needed for the input voltage value to become approximately equal to the maximum voltage value 2a from the voltage threshold 7a.

The noise filter time T2 corresponds to a width of a noise pulse to be generated. The noise pulse may periodically and instantaneously make the input voltage value to be zero. Therefore, the noise filter time T2 is set to be extremely shorter than the increasing delay time T1.

Figure 4:
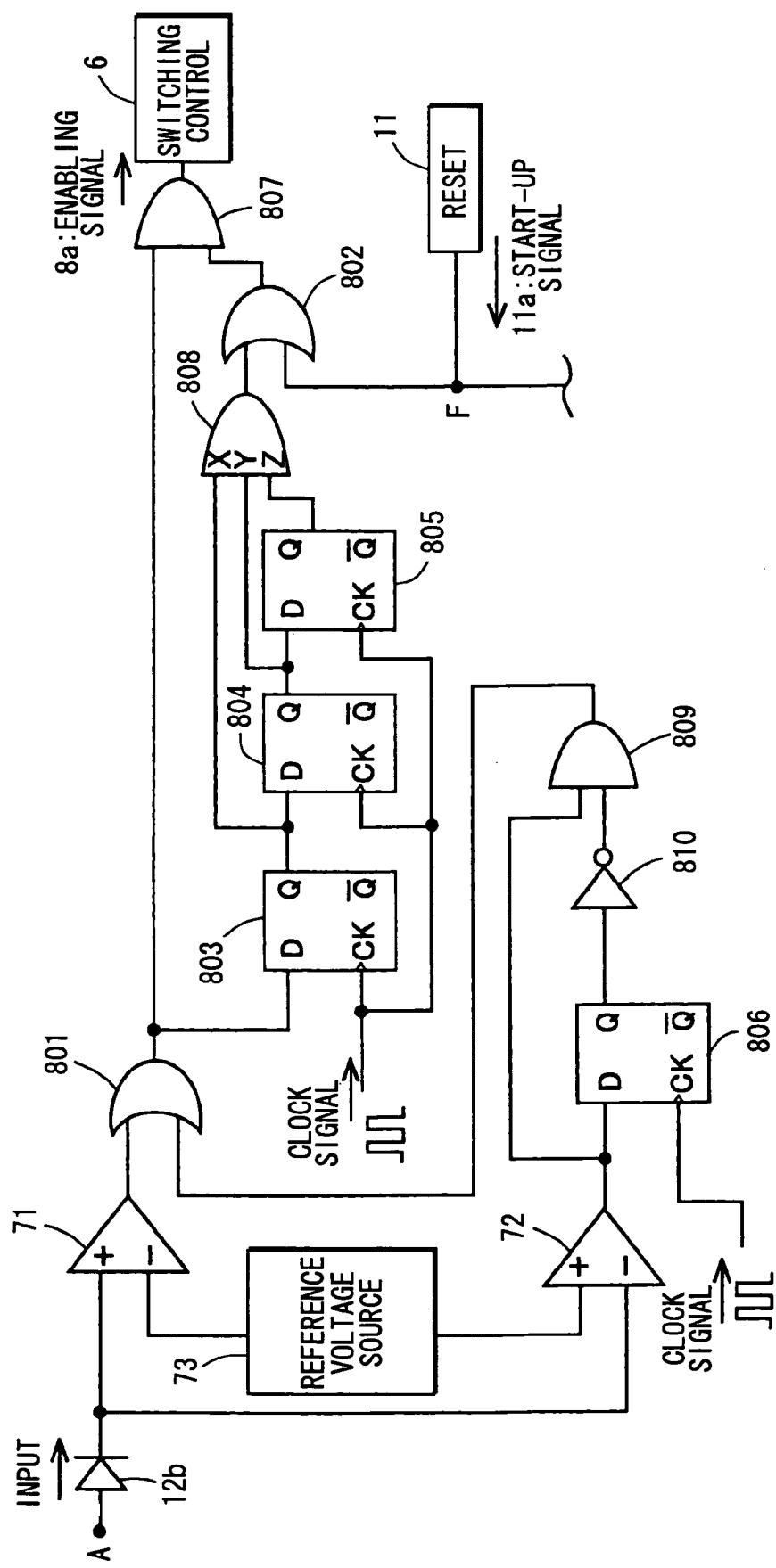
FIG. 4 is a schematic circuit diagram showing a voltage detector and a delay circuit of the switching booster power circuit.

Here, circuit construction of the voltage detector 7 and the delay circuit 8 will be described with reference to FIG. 4. As shown in FIG. 4, the voltage detector 7 includes comparators 71, 72 and a reference voltage source 73. The delay circuit 8 includes OR circuits 801, 802, delay flip-flop (DFF) circuits 803, 804, 805, 806, AND circuits 807, 808, 809 and an NOT circuit 810.

The OR circuit 801, 802 has two or more inputs, and outputs signal (on) when signal (on) is input into at least one input of the OR circuit 801, 802. The AND circuit 807, 808, 809 outputs signal (on), when signals (on) are input into all inputs of the AND circuit 807, 808, 809. The NOT circuit 810 outputs signal (on) when signal is not input into the NOT circuit 810, and the NOT circuit 810 outputs signal (off) when signal is input into the NOT circuit 810. That is, the NOT circuit 810 inverts input signal, and outputs the inverted input signal as output signal. The DFF circuit 803, 804, 805, 806 delays outputting signal from an output terminal (Q terminal), after signal has been input into the DFF circuit 803, 804, 805, 806 through an input terminal (D terminal).

A non-inversion terminal (+) of the comparator 71 is connected to the cathode of the diode 12b, and an inversion terminal (−) of the comparator 71 is connected to the reference voltage source 73. A non-inversion terminal (+) of the comparator 72 is connected to the reference voltage source 73, and an inversion terminal (−) of the comparator 72 is connected to the cathode of the diode 12b. The reference voltage source 73 inputs voltage to be the voltage threshold 7a into the inversion terminal of the comparator 71 and the non-inversion terminal of the comparator 72. That is, the comparator 71, 72 compares voltage value detected at the voltage detection point A (i.e., input voltage value) and the voltage threshold 7a.

The comparator 71 outputs signal when the input voltage value is equal to or larger than the voltage threshold 7a. An output terminal of the comparator 71 is connected to a first input terminal of the OR circuit 801. Further, the comparator 72 outputs signal when the input voltage value is smaller than the voltage threshold 7a. An output terminal of the comparator 72 is connected to the D terminal of the DFF circuit 806 and a first input terminal of the AND circuit 809.

A second input terminal of the OR circuit 801 is connected to an output terminal of the AND circuit 809. An output terminal of the OR circuit 801 is connected to a first input terminal of the AND circuit 807 and the D terminal of the DFF circuit 803.

The Q terminal of the DFF circuit 803 is connected to the D terminal of the DFF circuit 804 and a first input terminal X of the AND circuit 808. The Q terminal of the DFF circuit 804 is connected to the D terminal of the DFF circuit 805 and a second input terminal Y of the AND circuit 808. The Q terminal of the DFF circuit 805 is connected to a third input terminal Z of the AND circuit 808. Clock signal is input into a clock (CK) terminal of the DFF circuit 803, 804, 805.

An output terminal of the AND circuit 808 is connected to a first input terminal of the OR circuit 802. The reset circuit 11 is connected to a second input terminal of the OR circuit 802 through the connection point F. An output terminal of the OR circuit 802 is connected to a second input terminal of the AND circuit 807. An output terminal of the AND circuit 807 is connected to the switching control 6.

As described above, the output terminal of the comparator 72 is connected to the D terminal of the DFF circuit 806 and the first input terminal of the AND circuit 809. The Q terminal of the DFF circuit 806 is connected to an input terminal of the NOT circuit 810. Further, clock signal is input into the CK terminal of the DFF circuit 806. An output terminal of the NOT circuit 810 is connected to a second input terminal of the AND circuit 809. The output terminal of the AND circuit 809 is connected to the second input terminal of the OR circuit 801.

Next, operation of the voltage detector 7 and the delay circuit 8 will be described, when the input voltage value is equal to or larger than the voltage threshold 7a. The input voltage value detected at the voltage detection point A is compared with the voltage threshold 7a by the comparator 71. The comparator 71 outputs signal (on) into the OR circuit 801, when the input voltage value is equal to or larger than the voltage threshold 7a. Then, the OR circuit 801 outputs signal (on) into the first input terminal of the AND circuit 807 and the D terminal of the DFF circuit 803. Then, the DFF circuit 803 outputs signal (on) from the Q terminal into the D terminal of the DFF circuit 804 and the X terminal of the AND circuit 808. The output by the DFF circuit 803 is delayed from the output by the OR circuit 801.

Similarly to the DFF circuit 803, the DFF circuits 804, 805 output signals (on) into the Y terminal and the Z terminal of the AND circuit 808, respectively. The output by the DFF circuit 804, 805 is also delayed from the output by the OR circuit 801. The AND circuit 808 outputs signal (on) into the second input terminal of the AND circuit 807 through the OR circuit 802, after signals (on) are input into all of the input terminals X, Y, Z of the AND circuit 808.

The first input terminal of the AND circuit 807 directly receives signal from the OR circuit 801, and the second input terminal of the AND circuit 807 receives signal through the DFF circuits 803, 804, 805. Therefore, the AND circuit 807 outputs the enabling signal 8a into the switching control 6, when the AND circuit 807 receives the signal delayed by the DFF circuits 803, 804, 805. That is, a delay time of the signal output by the DFF circuits 803, 804, 805 corresponds to the increasing delay time T1. Hereinafter, the DFF circuits 803, 804, 805 and the AND circuit 808 may be defined as an increasing delay circuit.

Next, the operation of the voltage detector 7 and the delay circuit 8 will be described, when the input voltage value is smaller than the voltage threshold 7a. In this case, because the comparator 71 does not output signal, any signal is not input into the first input terminal of the OR circuit 801. The comparator 72 outputs signal (on) into the D terminal of the DFF circuit 806 and the first input terminal of the AND circuit 809, when the input voltage value is smaller than the voltage threshold 7a. Then, the DFF circuit 806 outputs signal (on) from the Q terminal into the input terminal of the NOT circuit 810. Thereby, the NOT terminal 810 stops outputting signal. That is, at this time, the output terminal of the NOT circuit 810 stops outputting signal into the second input terminal of the AND circuit 809.

Here, when the input voltage value is equal to or larger than the voltage threshold 7a, the NOT circuit 810 outputs signal into the second input terminal of the AND circuit 809, because signal is not input into the NOT circuit 810. In contrast, when the input voltage value is smaller than the voltage threshold 7a, the NOT circuit 810 stops outputting the signal into the second input terminal of the AND circuit 809, because the signal delayed by the DFF circuit 806 is input into the NOT circuit 810.

Immediately after the input voltage value becomes smaller than the voltage threshold 7a, the first input terminal of the AND circuit 809 receives signal output from the comparator 72. Further, the second input terminal of the AND circuit 809 receives signal output from the NOT circuit 810 when the input voltage value is equal to or larger than the voltage threshold 7a. That is, because the signal output from the comparator 72 is delayed by the DFF circuit 806, the AND circuit 809 outputs signal before the NOT circuit 810 stops outputting signal. The signal output from the AND circuit 809 is input into the AND circuit 807 and the DFF circuit 803 through the OR circuit 801, similarly to the signal output from the comparator 71.

Therefore, when the input voltage value becomes smaller than the voltage threshold 7a while the enabling signal 8a is output, the AND circuit 807 continues to output the enabling signal 8a during the delay time of the signal output from the DFF circuit 806. That is, the delay time of the signal output from the DFF circuit 806 corresponds to the noise filter time T2. In addition, when the signal output from the NOT circuit 810 is stopped, the AND circuit 809 stops outputting the signal. Further, because the comparator 71 does not output the signal, the enabling signal 8a is not output.

Further, the delay circuit 8 receives the start-up signal 11a output from the reset circuit 11. The start-up signal 11a is input into the second input terminal of the OR circuit 802 from the reset circuit 11. The OR circuit 802 is subsequent to the increasing delay circuit. That is, while the start-up signal 11a is output, signal is output into the AND circuit 807 without waiting for the delay time (i.e., increasing delay time T1) delayed by the increasing delay circuit. Therefore, while the reset circuit 11 outputs the start-up signal 11a, the increasing delay time T1 is canceled.

Next, operation of the switching booster power circuit 1 will be described with reference to FIGS. 1 and 2. As shown in FIG. 1, when the switching booster power circuit 1 is activated, that is when the power switch 4 is turned on, voltage is applied to the output capacitor 3 from the battery 2. At the same time, the voltage detector 7 detects the input voltage value at the voltage detection point A.

As shown in FIG. 2, the input voltage value gradually increases until the input voltage value becomes equal to the maximum voltage value 2a. When the increasing delay time T1 is elapsed after the input voltage becomes larger than the voltage threshold 7a, the delay circuit 8 outputs the enabling signal 8a into the switching control 6, in response to the determination of the voltage detector 7. That is, the switching control 6 is not activated before the input voltage value becomes equal to or larger than the voltage threshold 7a, and the switching control 6 is not activated during the increasing delay time T1.

When the switching control 6 receives the enabling signal 8a, the switching control 6 outputs the driving signal 6a relative to the gate of the field-effect transistor 5c. The field-effect transistor 5c performs switching in response to the driving signal 6a of the switching control 6. Thereby, voltage of the battery 2 is increased, and the increased voltage is input into the output capacitor 3. Thus, the output capacitor 3 can be more charged by the increased voltage.

The increased voltage is decreased to the rated voltage 9a by the step-down circuit 10, and the decreased voltage is supplied to the microcomputer 9 and the reset circuit 11. When the reset time T3 is elapsed after the decreased voltage becomes equal to the rated voltage 9a, the reset circuit 11 outputs the start-up signal 11a into the microcomputer 9 and the delay circuit 8. The microcomputer 9 is activated in response to the start-up signal 11a. Further, the delay circuit 8 cancels the increasing delay time T1 in response to the start-up signal 11a. That is, as shown in FIG. 2, the enabling signal 8a is output at the same time as the input voltage becomes larger than the voltage threshold 7a while the delay circuit 8 receives the start-up signal 11a.

Thereby, the delay function of the delay circuit 8 is not repeated after the start-up signal 11a is received by the delay circuit 8, so that the switching control 6 can operate smoothly. For example, if noise is periodically generated after the start-up signal 11a is received by the delay circuit 8, infinite loop of the delay function can be restricted, so that boosting function by the booster circuit 5 can be properly performed.

The reset time T3 may be approximately equal to or larger a time period needed for a transmission circuit of the microcomputer 9 to become stable. The reset time T3 is larger than the increasing delay time T1, so that the reset circuit 11 does not output the start-up signal 11a while the rush current remarkably passes.

Further, a microcomputer typically includes its own reset circuit, and the reset circuit outputs a start-up signal when input voltage becomes stable after the input voltage becomes equal to a rated voltage. Therefore, the microcomputer is reset for a time period longer than a rush current period. In this embodiment, the own reset circuit provided in the microcomputer 9 may be used as the reset circuit 11. That is, the increasing delay time T1, the noise filter time T2, and the reset time T3 have a relationship of T2<T1<T3. Furthermore, the reset circuit 11 may have the same construction as the delay circuit 8. In this case, the reset time T3 can be also controllable.

Here, while the enabling signal 8a is output, the input voltage value may instantaneously be zero due to noise, for example. When the input voltage value becomes smaller than the voltage threshold 7a during the noise filter time T2, the delay circuit 8 outputs the enabling signal 8a. That is, when a pulse width (i.e., instantaneous stop time) of the noise is equal to or smaller than the noise filter time T2, the switching control 6 continues to operate. Further, as shown in FIG. 2, when the pulse width of the noise is larger than the noise filter time T2, the enabling signal 8a is stopped after the noise filter time T2 is elapsed.

According to this embodiment, the field-effect transistor 5c can be protected from the rush current without increasing a capacitance of the transistor 5c. Further, the switching control 6 can appropriately start controlling the transistor 5c, and can stably control the transistor 5c.

In this embodiment, the switching booster power circuit 1 includes the voltage detector 7 and the delay circuit 8. Thereby, the rush current can be restricted from flowing through the transistor 5c, and the controlling of the transistor 5c can be started without delay.

As shown in FIG. 3, the rush current is remarkably generated while the input voltage is increased toward the maximum voltage value 2a, immediately after the power switch 4 is turned on. Therefore, the increasing delay time T1 is set to be ended after the input voltage becomes approximately equal to the maximum voltage value 2a.

Further, the voltage detection point A may be disposed between the power switch 4 and the coil 5a. Thereby, voltage of the battery 2 can be accurately detected. That is, voltage variation by the coil 5a and the diode 5b does not need to be taken into consideration, and the voltage of the battery 2 can be detected without delay. Thus, delay function by the delay circuit 8 can be accurately performed.

Further, the voltage detection point A may be located at a current consuming side terminal of the power switch 4, while the power switch 4 has a battery side terminal and the current consuming side terminal. Furthermore, the voltage detection point A may be directly connected to the current consuming side terminal of the power switch 4 through a wiring, for example. Thereby, the voltage detector 7 can directly detect voltage of the switching booster power circuit 1. Therefore, the delay circuit 8 can quickly respond to operate. Thus, the rush current can be restricted from flowing through the transistor 5c, and the controlling of the transistor 5c can be started without delay.

The battery 2 is used as a direct-current power source. Alternatively, a direct-current stabilized power source, or a charged capacitor may be used as the direct-current power source. Further, the power switch 4 may be an exciting switch for connecting the battery 2 and the output capacitor 3, when an ignition switch of a vehicle is turned on, for example.

Such changes and modifications are to be understood as being within the scope of the present invention as defined by the appended claims.

What is claimed is:

1. A switching booster power circuit comprising:
    a power switch for connecting a direct-current power source and an electric load having a capacitance;
    a booster circuit including
        a coil disposed in an electricity supply line from the power switch to the electric load, the coil being connected in series with the power switch,
        a diode disposed between the coil and the electric load in the electricity supply line, the diode being connected in series with power switch, and
        a switching element connected in parallel with the power switch, between the coil and the diode;
    a switching control for controlling on/off of the switching element;
    a voltage detector for detecting an input voltage value at a predetermined point of the electricity supply line and determining the input voltage value to be larger than a predetermined voltage threshold or not, wherein the voltage threshold is equal to or smaller than a maximum voltage value of the direct-current power source;
    a delay circuit for outputting an enabling signal enabling the switching control to operate, when a first predetermined time is elapsed after the input voltage value becomes larger than the voltage threshold;
    a microcomputer connected in parallel with the electric load from a connection point between the diode and the electric load;
    a step-down circuit disposed between the connection point and the microcomputer, wherein the step-down circuit gradually decreasing a voltage supplied from the direct-current power source or the electric load to a rated voltage of the microcomputer; and
    a reset circuit, a first end of which is connected to the step-down circuit and a second end of which is connected to the microcomputer and the delay circuit, wherein
    the reset circuit detects a decreased voltage value decreased by the step-down circuit,
    the reset circuit outputs a start-up signal for activating the microcomputer into the microcomputer and the delay circuit when a third predetermined time is elapsed after the decreased voltage becomes approximately equal to the rated voltage, and
    the delay circuit outputs the enabling signal into the switching control without waiting for the first predetermine time, when the input voltage value is equal to or larger than the voltage threshold while the delay circuit receives the start-up signal.

2. The switching booster power circuit according to claim 1, wherein
    the first predetermined time is equal to or larger than a time period needed for the input voltage value to increase from the voltage threshold to the maximum voltage value.

3. The switching booster power circuit according to claim 1, wherein
    the predetermined point is located between the power switch and the coil.

4. The switching booster power circuit according to claim 1, wherein
    the predetermined point is located at a current consuming side terminal of the power switch.

5. The switching booster power circuit according to claim 1, wherein
    the delay circuit stops outputting the enabling signal, when the input voltage value continues to be smaller than the voltage threshold for a second predetermined time period while the delay circuit outputs the enabling signal, and
    the delay circuit continues to output the enabling signal, when the input voltage value disables to continue to be smaller than the voltage threshold for the second predetermined time period.

6. The switching booster power circuit according to claim 1, wherein
    the third predetermined time is equal to or larger than a time period needed for a transmission circuit of the microcomputer to become stable.

* * * * *